US008922054B2

(12) United States Patent
Sihler et al.

(10) Patent No.: US 8,922,054 B2
(45) Date of Patent: Dec. 30, 2014

(54) DISTRIBUTED DC ENERGY STORAGE FOR SUPPLYING AN INTERMITTENT SUBSEA LOAD

(75) Inventors: Christof Martin Sihler, Hallbergmoos (DE); Simon Herbert Schramm, Munich (DE); Stefan Schroeder, Munich (DE)

(73) Assignee: General Electric Company, Niskayuna, NY (US)

(*) Notice: Subject to any disclaimer, the term of this patent is extended or adjusted under 35 U.S.C. 154(b) by 765 days.

(21) Appl. No.: 13/194,978

(22) Filed: Jul. 31, 2011

(65) Prior Publication Data

US 2013/0026831 A1 Jan. 31, 2013

(51) Int. Cl.
*H02J 3/38* (2006.01)
*H02J 3/32* (2006.01)
*H02J 7/34* (2006.01)
*H02M 7/49* (2007.01)
*H02M 7/5387* (2007.01)
*H02J 1/10* (2006.01)
*H02M 7/483* (2007.01)

(52) U.S. Cl.
CPC . *H02J 3/32* (2013.01); *H02J 7/345* (2013.01); *H02M 7/49* (2013.01); *H02M 7/5387* (2013.01); *H02J 1/10* (2013.01); *H02M 2007/4835* (2013.01)
USPC .......................................................... 307/19

(58) Field of Classification Search
USPC .......................................................... 307/19
See application file for complete search history.

(56) References Cited

U.S. PATENT DOCUMENTS

| 7,851,943 | B2 | 12/2010 | Datta et al. | |
|---|---|---|---|---|
| 8,624,431 | B2* | 1/2014 | Kanakasabai et al. | 307/32 |
| 2010/0019930 | A1 | 1/2010 | Biester et al. | |
| 2010/0026234 | A1* | 2/2010 | Stale et al. | 320/101 |
| 2010/0133901 | A1* | 6/2010 | Zhang et al. | 307/11 |
| 2012/0112545 | A1* | 5/2012 | Aiello et al. | 307/65 |

FOREIGN PATENT DOCUMENTS

WO 2010102667 A1 9/2010

OTHER PUBLICATIONS

Search Report and Written Opinion from corresponding PCT Application No. PCT/US2013/023435 dated Oct. 10, 2013.
Song-Manguelle et al., "A Modular Stacked DC transmission and distribution system for long distance subsea applications", 2012 IEEE Energy Conversion Congress and Exposition (ECCE), pp. 4437-4444, Sep. 1, 2012.

* cited by examiner

*Primary Examiner* — Jared Fureman
*Assistant Examiner* — Duc M Pham
(74) *Attorney, Agent, or Firm* — Andrew J. Caruso (57) ABSTRACT

A power distribution system includes a plurality of load side power converters configured in a modular stacked DC (MSDC) converter architecture. Each load side converter includes a respective energy storage device such that together the plurality of energy storage devices provides a distributed subsea energy storage system configured to maintain a common subsea busbar voltage substantially constant during intermittent load voltage excursions.

23 Claims, 6 Drawing Sheets

DISTRIBUTED DC ENERGY STORAGE FOR SUPPLYING AN INTERMITTENT SUBSEA LOAD

BACKGROUND

The subject matter of this disclosure relates generally to subsea control systems, and more particularly to a distributed type direct current (DC) energy storage system that can be easily integrated with a modular stacked DC (MSDC) topology for subsea applications.

Figure 1:
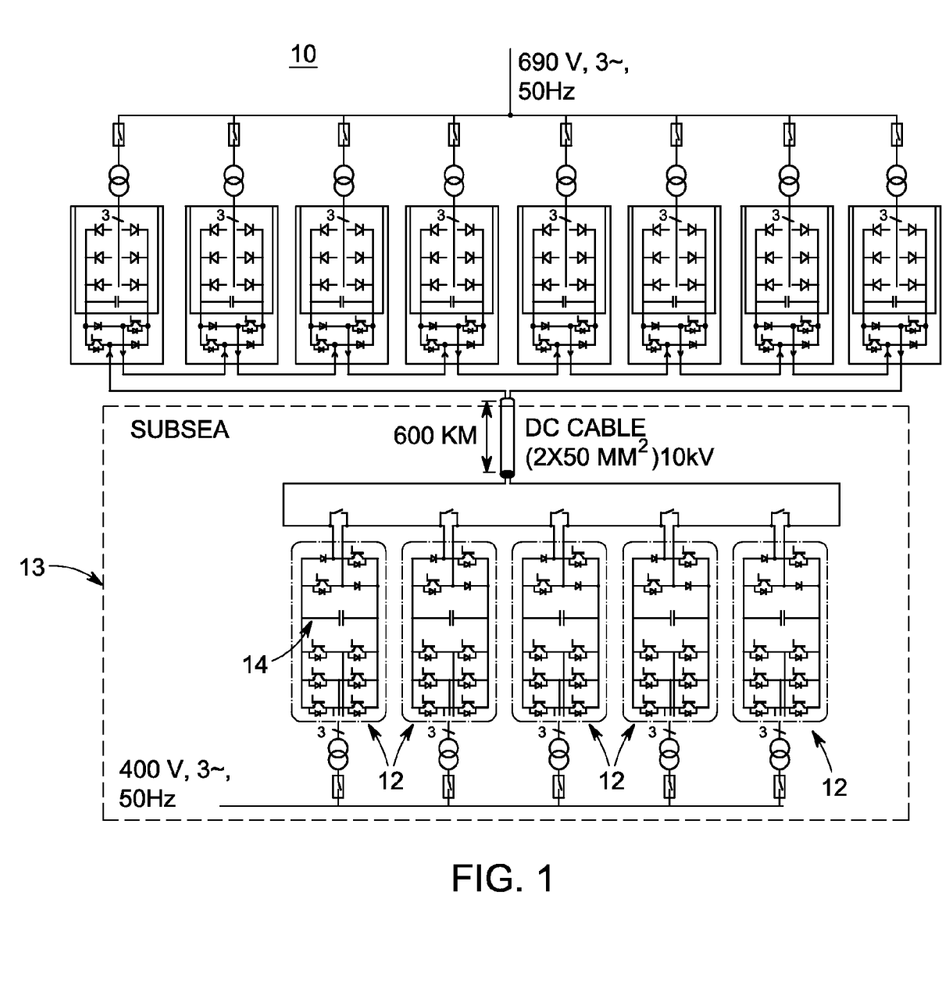
FIG. 1 is a simplified diagram illustrating a subsea power transmission/distribution system with modular stacked power converter building blocks configured with distributed energy storage elements on the subsea side of the system according to one embodiment of the invention.

Modular stacked DC converter architectures are well suited for subsea applications requiring transmission and distribution over long distances. Unlike other DC transmission options, wherein the DC transmission (link) voltage is controlled, i.e. maintained nearly constant, the DC transmission (link) current is controlled in the relevant modular stacked DC converter design. One MSDC architecture 10 is depicted in FIG. 1. The MSDC architecture gets its name from the fact that the architecture uses several modular DC-DC/AC converter modules stacked and connected in series on the DC side, both at the sending end and at the receiving end of the transmission link such as depicted in FIG. 1. The converter modules at the receiving (subsea) end can also be arranged in a distributed way, each module enclosed in a pressure vessel of its own, rather than really stacking them within one vessel.

All subsea installations require control systems. Subsea control systems may consist of dozens or hundreds of low power consumers, e.g. electrically driven sensors for the physical displacements of valves. Transmitting power for subsea control systems over long distances is challenging because these loads typically require a constant subsea busbar voltage. Constant busbar voltages are known to be difficult to achieve when the loads are supplied by a long transmission cable, e.g. more than 100 km cable length, and some of the loads are intermittent (i.e. actuators for opening or closing valves). Maintaining a constant output voltage on the receiving end despite fluctuating load levels requires a feedback control of the system voltage by power electronics. DC power transmission requires a subsea inverter, e.g. an inverter based on MSDC technology. An MSDC inverter, in addition to converting DC to AC, may keep a subsea DC-link voltage constant by way of boosting the voltage at the end of the transmission line. Because of the intermittent operation requirements described herein, the power consumption of subsea control systems is typically characterized by a continuous rating, e.g. 30 kW for large systems, and an additional short-time power rating that may be, for example, 3-4 times higher than the continuous power rating, e.g. 100 kW for 60 seconds.

Long distance DC transmission cables must have a sufficiently large cross section to maintain the voltage drop along the cable with acceptable limits. If the voltage arriving at the end of the cable is too low, it cannot be boosted up to the constant busbar voltage required for the subsea loads. Generally, techniques for avoiding subsea cables with a large cable cross-section to achieve a constant busbar voltage when supplying high, short-time power, e.g. 100 kW, employ a centralized subsea energy storage system, e.g. rated to supply 100 kW for 60 seconds (=6 MJ). Centralized subsea energy storage systems are disadvantageous in that they require a significant subsea volume/large and heavy subsea containment. Centralized subsea energy storage systems are further disadvantageous in that a defect in a single storage element may adversely impact the entire energy storage capability. Centralized subsea energy storage systems are further disadvantageous in that significant control scheme changes may be required to implement the requisite energy storage capability.

In view of the foregoing, there is a need to add an energy storage system to a subsea system in which the energy storage system overcomes the herein described disadvantages of centralized subsea energy storage systems.

BRIEF DESCRIPTION

An exemplary embodiment of the present invention comprises a power distribution system comprising:
a power source side;
a load side; and
a plurality of power converters on each of the power source side and the load side, wherein the power source side converters and the load side converters are each configured to provide a modular stacked dc converter architecture, and further wherein the load side converters are each configured with a respective energy storage system such that together the plurality of energy storage systems deliver energy to a common control system busbar.

According to another embodiment, a power distribution system comprises a plurality of load side power converters configured in a modular stacked DC (MSDC) converter architecture, wherein the load side power converters each comprise a respective energy storage device such that together the plurality of energy storage devices provides a distributed energy storage system configured to maintain a common control system busbar voltage substantially constant during intermittent load voltage excursions.

DRAWINGS

The foregoing and other features, aspects and advantages of the invention are apparent from the following detailed description taken in conjunction with the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Subsea cables or umbilicals are by far the most expensive components in long distance transmission systems, e.g. for distances larger than 100 km. The embodiments described herein with reference to the Figures are directed to subsea energy storage in combination with long distance power transmission in a topology that alleviates the necessity for subsea cables with an excessively large cable cross-section to achieve a constant bus bar voltage when supplying high, short-time subsea control system power.

FIG. 1 is a simplified diagram illustrating a subsea power transmission/distribution system 10 with a plurality of modular stacked power converter building blocks 12, each load side converter configured with one or more distributed energy storage elements 14 on the load side of the system according to one embodiment of the invention. The subsea power transmission/distribution system 10 provides one option for fulfilling the peak power requirement. The distributed storage topology depicted in power transmission/distribution system 10 advantageously provides reliability benefits compared to centralized bulk storage solutions, because a defect in a single storage element 14 will not impact the remaining system storage capabilities. Further, there are no significant modifications required when using a MSDC control scheme due to the simplicity of the storage control scheme.

With continued reference to FIG. 1, each load side DC-AC inverter 12 employed by power transmission/distribution system 10 comprises one or more distributed storage offshore (DSO) elements 14 integrated therein. The plurality of DC-AC inverters 12 and respective energy storage elements 14 are distributed in an offshore facility 13 such as a watercraft or a topside platform that may be fixed or floating according to different aspects of the embodiments described herein. Each DSO element 14 may comprise, without limitation, one or more capacitors such as ultracapacitors or energy storage cells such as rechargeable batteries. An ultracapacitor as used herein means a capacitor that has much greater energy density and power per pound than electrostatic and electrolytic capacitors. Ultracapacitors are also called "supercapacitors." According to another aspect, the plurality of DC-AC inverters 12 and respective energy storage elements 14 are distributed subsea in close proximity to the subsea loads to form a subsea electric power distribution system.

Figure 2:
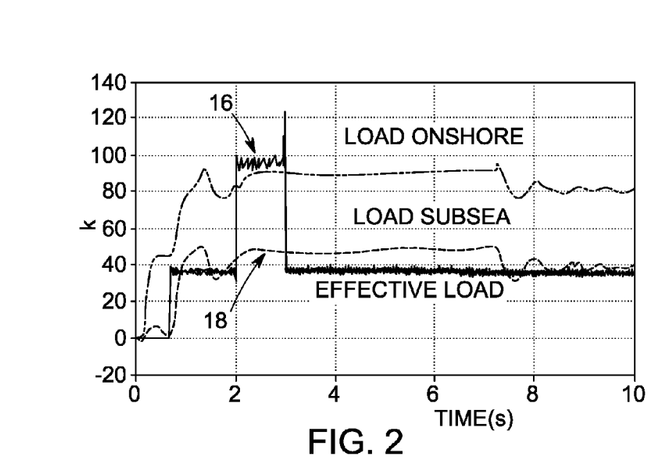
FIGS. 2-5 illustrate operation of the subsea power transmission/distribution system depicted in FIG. 1.
Figure 3:
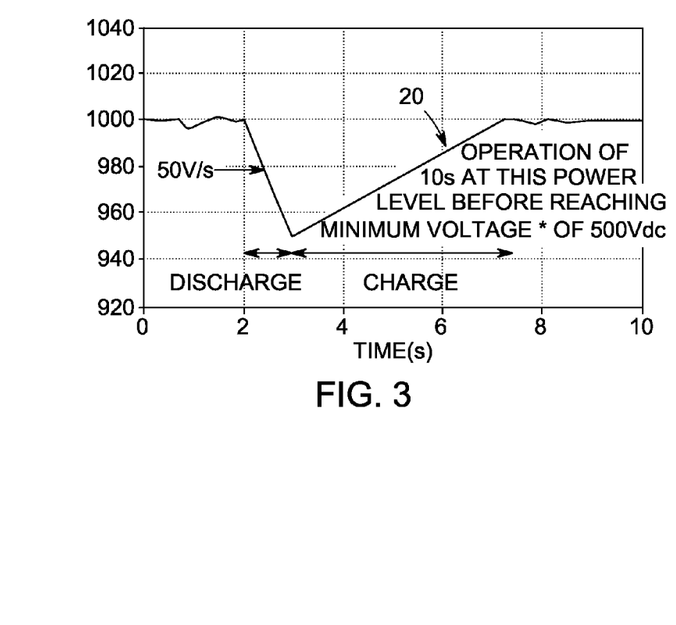

FIGS. 2-5 illustrate simulated operation of the subsea power transmission/distribution system 10 depicted in FIG. 1, including distributed storage capabilities implemented in the load side converters 12, according to one embodiment. With reference now to FIG. 2, a load increase 16 after t=2 seconds cannot be covered by the transmission capability of the cable 18 and results in a discharge of corresponding link capacitors/DSO elements 14 such as illustrated in FIG. 3, thus providing the requisite power to the subsea loads. The peak power is required for only 1 sec, followed immediately by a charge period of the distributed storage which is completed at t=7 sec as depicted in FIG. 3.

Figure 4:
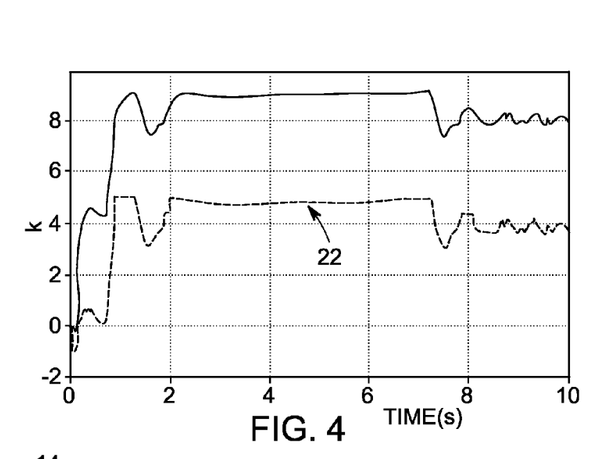

FIG. 4 illustrates the onshore transmitted and subsea load DC voltage levels during the same time period depicted in FIGS. 2 and 3. The voltage level on the receiving end of the cable (subsea) is almost constant between 3 s≤t≤7 s indicating a constant, but increased (as compared to t>8 s, normal load in steady state) power transmission during that time (as power is proportional to voltage for constant current operation). This additional power transmitted from the shore, used for charging the distributed storage elements 14 can also be determined as the difference between the received power 18 from the transmission system and the power 16 consumed by the subsea loads for 3 s≤t≤7 s (FIG. 2), which is about 10 kW.

It can be appreciated the minimum voltage level for the storage is not a fixed value since it depends upon the power demand subsequent to the peak period. The maximum power which can be received by the converters 12 is defined by $P_{rec}=V_{sub} \cdot I_{Ring}$, where $V_{sub}$ is the subsea voltage and is linked to the DC link voltage by the duty cycle occurring during the energy storage operation at its limits. The maximum subsea voltage $V_{sub}$ is therefore equal to the sum of the nominal DC link voltages of the converters 12 as exemplified herein according to one embodiment.

Figure 5:
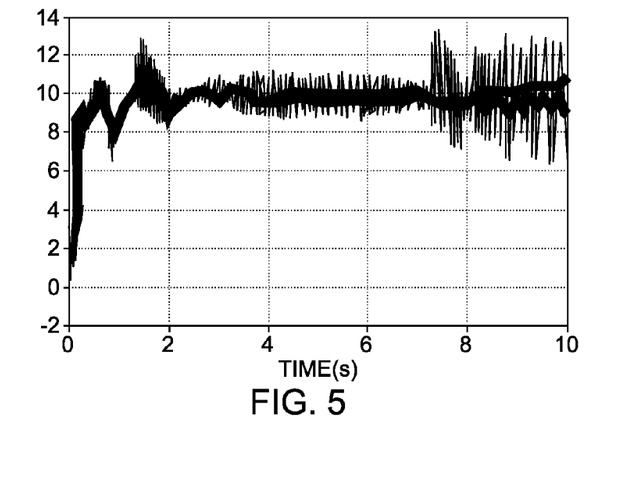

If for example, the DC link voltage of the distributed storage is discharged to 500V per module 12, and the ring current such as depicted in FIG. 5 is 10 A, the maximum power to be transmitted post fault with respect to five operational modules 12 is 5·500V·10 A=25 kW. The converter DC link voltage recovers, and accepts higher power levels to be transmitted from the shore.

Figure 6:
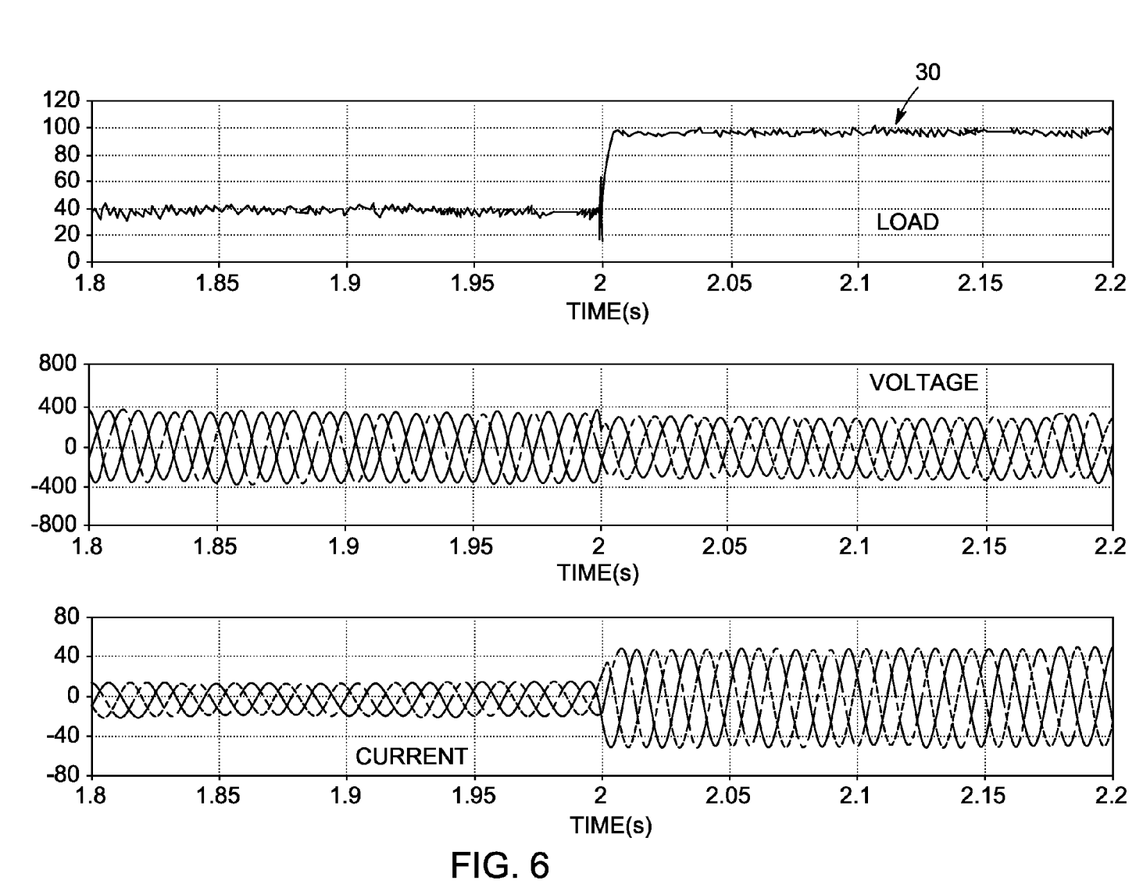
FIGS. 6 and 7 illustrate the reaction of the AC-bus voltage and output current of a single converter for an applied load step from ~38 kW to 100 kW for the subsea power transmission/distribution system depicted in FIG. 1.
Figure 7:
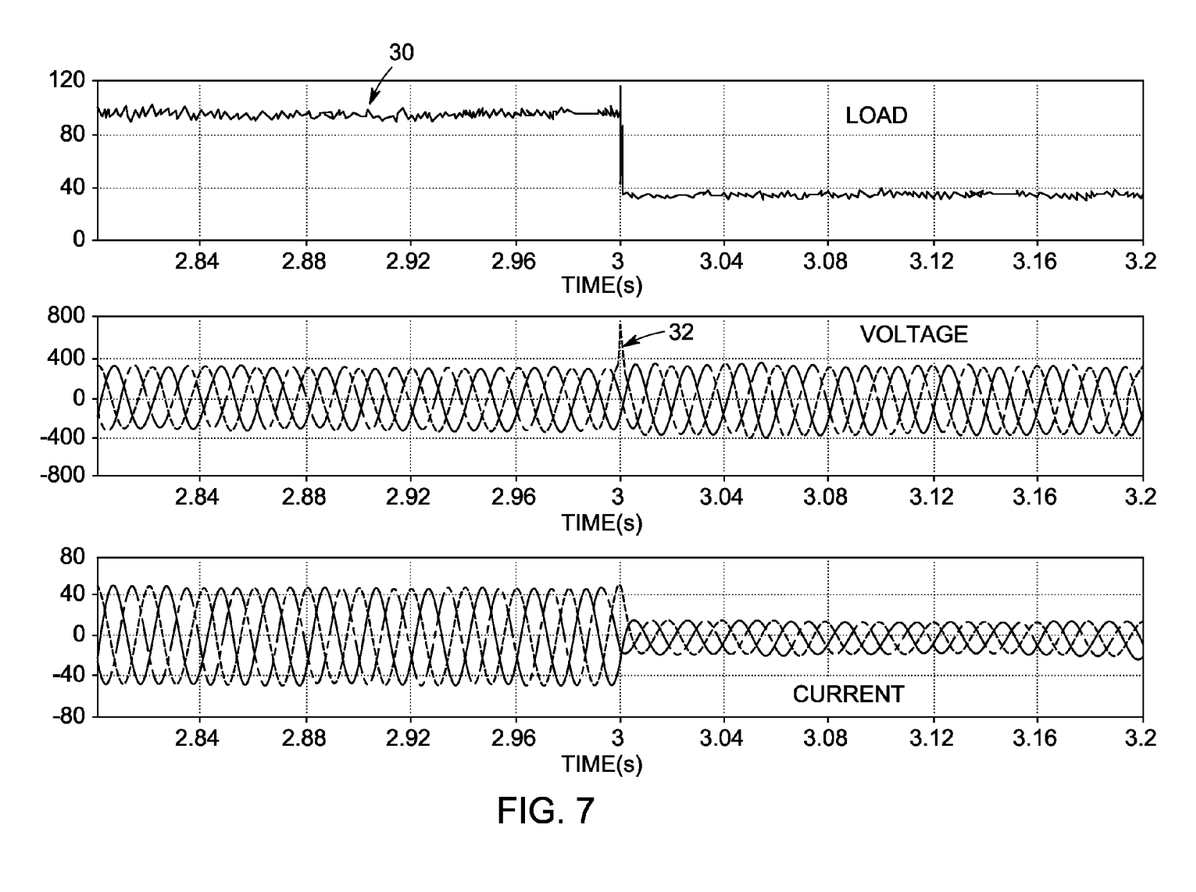

FIGS. 6 and 7 illustrate the reaction of the AC-bus voltage and output current of a single converter 12 for an applied load step from ~38 kW to 100 kW for the subsea power transmission/distribution system 10 depicted in FIG. 1. The voltage level depicted in the center plots of FIGS. 6 and 7 at the distribution bus is decreased during the high power period 30 because the output voltage of the converters 12 was not controlled during the simulation, power factor was kept to unity, although it can be appreciated the output voltage of the converters 12 would be controlled in a real system. The current levels depicted in the bottom plots of FIGS. 6 and 7 correspond to a single converter 12. A voltage spike 32 can be observed in the center plot of FIG. 7 during the power sag from peak power to nominal power due to the very fast current change in corresponding line and transformer inductors. An appropriate MOV device, for example, could protect the connected loads by limiting the over-voltage to acceptable values.

Figure 8:
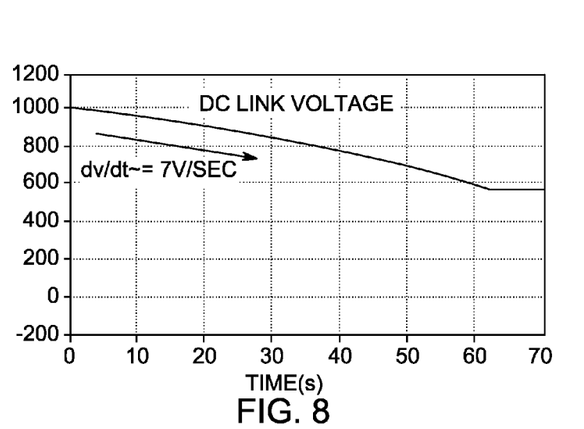
FIGS. 8-11 illustrate a load profile specification that provides 100 kW peak operation for a time period of 60 s for one embodiment of the subsea power transmission/distribution system depicted in FIG. 1.
Figure 9:
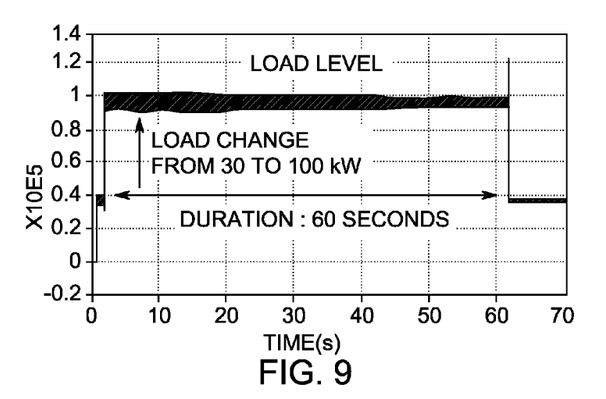
Figure 10:
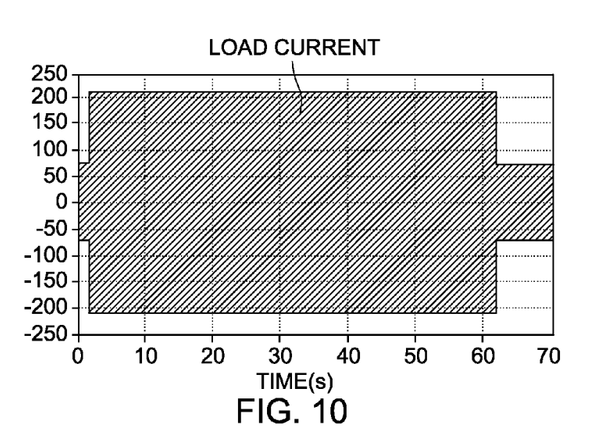
Figure 11:
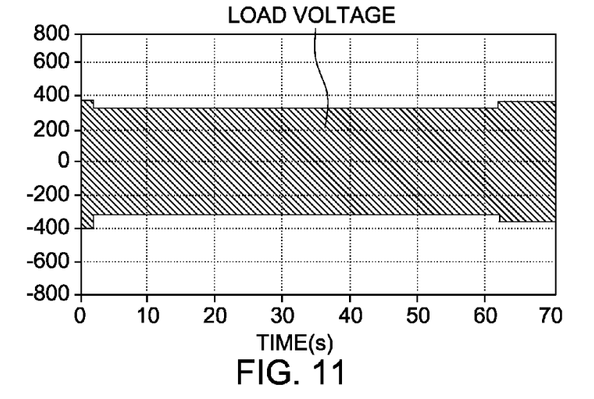

FIGS. 8-11 illustrate a load profile specification that provides 100 kW peak operation for a time period of 60 s for one embodiment of the subsea power transmission/distribution system 10 depicted in FIG. 1. Although the subsea power transmission/distribution system 10 can survive the 100 kW peak period, it will not however be able to continue operation for an infinite amount of time at the low load level (~38 kW), as the maximum load to be fed with the post peak period DC link voltage of ~600V is at most 5·600V·10 A=30 kW, which is below the requested power demand. FIG. 8 illustrates the DC link voltage is still decreasing after the peak period in which the storage is still in discharge operation.

Figure 12:
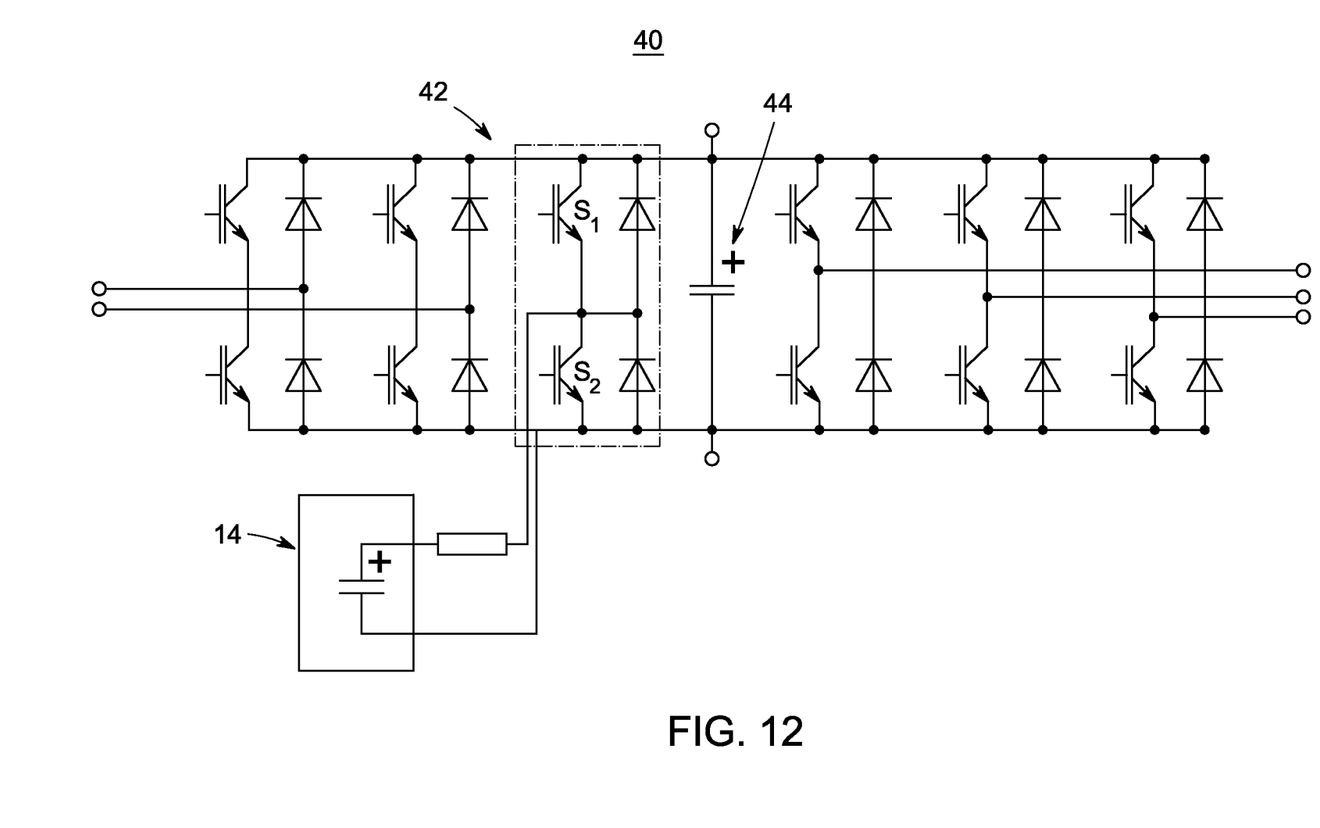
FIG. 12 illustrates in more detail, a MSDC converter configured with distributed storage elements according to one embodiment that is suitable to implement the modular stacked power converter building blocks configured with distributed energy storage elements on the subsea side of the system depicted in FIG. 1.

Two potential solutions can be realized to prevent power outages subsequent to significant utilization of the energy storage with given limitations. One embodiment comprises increasing the transmission current reference to increase the maximum transferable power by increasing the onshore voltage/nominal voltage limit. Another embodiment comprises reconfiguring a standard converter topology to provide a converter structure such as illustrated in FIG. 12 that illustrates in more detail a power converter 40 configured with distributed storage elements 14. Converter 40 is suitable to implement the modular stacked power converter building blocks configured with distributed energy storage elements on the load side of the system 10 depicted in FIG. 1. More specifically, converter 40 utilizes one leg from a DC/DC stage 42 as a bidirectional buck-boost converter that decouples the storage State of Charge (SoC) from a DC link voltage 44.

The required energy for the peak load period under the assumption of a maximum transferable power Ptrans=40 kW can be calculated as $E_{storage}=(P_{peak}-P_{trans})\cdot 60$ s=60 kW·60 s=3.6 MJ, which would only be sufficient with a structure fully decoupling the storage voltage level from the converter DC link voltage 44, as depicted in FIG. 12. The effectively transferrable power is dependent upon the DC link voltage; a storage coupled directly to the DC link voltage would require a higher capacity. According to one embodiment, discharging the storage to 50% of the nominal voltage results in a 75% usage of the storage SoC ($E_{mod}=(\frac{1}{2})CU^2$. According to one embodiment based on the 3.6 MJ energy demand, and using predetermined commercially available ultracaps with predetermined commercially available modules, the energy per module can be determined as:

$$\text{Energy per module}(E_{mod})=(\frac{1}{2})CU^2=(\frac{1}{2})(63)F\cdot 125V^2=0.49MJ.$$

In summary explanation, embodiments of a distributed type direct current (DC) energy storage system that can be easily integrated with a modular stacked DC (MSDC) topology for subsea applications have been described herein. The embodied energy storage in combination with long distance power transmission results in a topology that alleviates the necessity for subsea cables with an excessively large cable cross-section to achieve a constant bus bar voltage when supplying high, short-time subsea control system power. The distributed storage embodiments described herein provide advantages compared to a centralized storage in terms of controllability and reliability. It can be appreciated that particular distributed storage embodiments formulated according to the principles described herein may require a rating of converter modules that is equal to the specified maximum short-time power, divided by the number of converter modules configured in a series topology.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power distribution system comprising:
a power source side;
a load side; and
a plurality of power converters on each of the power source side and the load side, wherein at least the load side converters are each configured to provide a modular stacked dc converter architecture, and further wherein the load side converters are each configured with a respective energy storage system such that together the plurality of energy storage systems deliver energy to a common control system busbar;
wherein, each load side converter comprises a DC/DC converter stage and a DC link capacitor with one leg of the DC/DC converter stage decoupling a respective subsea energy storage device from its corresponding DC link capacitor.

2. The power distribution system according to claim 1, wherein the plurality of load side converters and corresponding subsea energy storage systems together are configured to provide a distributed DC energy storage system.

3. The power distribution system according to claim 1, wherein the energy storage systems comprise energy storage devices selected from capacitors, and storage batteries.

4. The power distribution system according to claim 3, wherein the capacitors comprise ultracapacitors.

5. The power distribution system according to claim 1, wherein the plurality of load side converters are configured in series to satisfy a predetermined peak energy demand for a predetermined period of time that can otherwise only be satisfied by increasing the power source side voltage level.

6. The power distribution system according to claim 1, wherein each load side converter comprises a DC link capacitor coupled directly to a respective energy storage device such that power transferred by the energy storage device is based upon its corresponding DC link capacitor voltage.

7. The power distribution system according to claim 1, wherein the plurality of energy storage systems are together configured as a distributed energy storage system to maintain a corresponding busbar voltage substantially constant during intermittent load voltage excursions.

8. The power distribution system according to claim 1, wherein the plurality of energy storage systems are together configured as a distributed energy storage system to maintain a corresponding control system voltage substantially constant during intermittent control system voltage excursions.

9. The power distribution system according to claim 1, wherein the load side converters comprise subsea converters.

10. The power distribution system according to claim 1, wherein the load side converters and respective energy storage systems are disposed in at least one offshore power distribution facility.

11. The power distribution system according to claim 10, wherein the offshore power distribution facility comprises a watercraft.

12. The power distribution system according to claim 10, wherein the offshore power distribution facility comprises an above water platform.

13. A power distribution system comprising a plurality of load side power converters configured in a modular stacked DC (MSDC) converter architecture, wherein the MSDC converters each comprise a respective energy storage device such that together the plurality of energy storage devices provides a distributed energy storage system configured to maintain a common control system busbar voltage substantially constant during intermittent load voltage excursions;
wherein, each load side converter comprises a DC/DC converter stage and a DC link capacitor with one leg of the DC/DC converter stage decoupling a respective energy storage device from its corresponding DC link capacitor.

14. The power distribution system according to claim 13, wherein energy storage devices are selected from capacitors and rechargeable storage batteries.

15. The power distribution system according to claim 14, wherein the capacitors comprise supercapacitors.

16. The power distribution system according to claim 13, wherein the plurality of load side converters are configured in series to satisfy a predetermined peak energy demand for a predetermined period of time that can otherwise only be satisfied by increasing the cross section of a transmission cable feeding the load side converters.

17. The power distribution system according to claim 13, wherein each load side converter comprises a DC link capacitor coupled directly to a respective energy storage device such that power transferred by each energy storage device is based upon its corresponding DC link capacitor voltage.

18. The power distribution system according to claim 13, wherein the plurality of energy storage devices are together configured as a distributed energy storage system to maintain a corresponding bulbar voltage substantially constant during intermittent load voltage excursions.

19. The power distribution system according to claim 13, wherein the plurality of energy storage devices are together configured as a distributed energy storage system to maintain a corresponding control system voltage substantially constant during intermittent control system voltage excursions.

20. The power distribution system according to claim 13, wherein the load side power converters comprise subsea converters.

21. The power distribution system according to claim 13, wherein the load side converters and respective energy storage devices are disposed in at least one offshore power distribution facility.

22. The power distribution system according to claim 21, wherein at least one offshore power distribution facility comprises a watercraft.

23. The power distribution system according to claim 21, wherein at least one offshore power distribution facility comprises an above water platform.

\* \* \* \* \*